United States Patent
Kaeser (10) Patent No.: US 9,811,704 B2
(45) Date of Patent: Nov. 7, 2017

(54) SUPPORT AND CAPSULE FOR PREPARING A BEVERAGE BY CENTRIFUGATION, SYSTEM AND METHOD FOR PREPARING A BEVERAGE BY CENTRIFUGATION

(71) Applicant: Nestec S. A., Vevey (CH)

(72) Inventor: Stefan Kaeser, Aarau (CH)

(73) Assignee: Nestec S.A., Vevey (CH)

( * ) Notice: Subject to any disclaimer, the term of this patent is extended or adjusted under 35 U.S.C. 154(b) by 27 days.

(21) Appl. No.: 15/022,111

(22) PCT Filed: Sep. 29, 2014

(86) PCT No.: PCT/EP2014/070724
§ 371 (c)(1),
(2) Date: Mar. 15, 2016

(87) PCT Pub. No.: WO2015/044400
PCT Pub. Date: Apr. 2, 2015

(65) Prior Publication Data
US 2016/0232390 A1    Aug. 11, 2016

(30) Foreign Application Priority Data

Sep. 30, 2013  (EP) ..................................... 13186568
Feb. 19, 2014  (EP) ..................................... 14155808

(51) Int. Cl.
*G06F 17/00*    (2006.01)
*G06K 7/10*    (2006.01)
(Continued)

(52) U.S. Cl.
CPC ...... *G06K 7/10861* (2013.01); *A47J 31/4492* (2013.01); *B65D 85/8043* (2013.01);
(Continued)

(58) Field of Classification Search
CPC .......... G06K 2019/06243; G06K 2019/06253; G06K 19/06018; G06K 19/06075;
(Continued)

(56) References Cited

U.S. PATENT DOCUMENTS 3,585,367 A * 6/1971 Humbarger ........ G06K 7/10881
235/454
3,636,317 A * 1/1972 Torrey ............... G06K 7/10881
235/462.03

(Continued)

FOREIGN PATENT DOCUMENTS

EP    2594171 A1    5/2013
WO    2011141535 A1    11/2011

OTHER PUBLICATIONS

International Search Report, dated Oct. 31, 2014, in PCT/EP2014/070724, filed Sep. 29, 2014.
(Continued)

*Primary Examiner* — Claude J Brown
(74) *Attorney, Agent, or Firm* — Dunlap Codding, P.C.

(57) ABSTRACT

A code support for association with or part of a capsule used in delivering a beverage in a beverage producing device by centrifugation of the capsule is disclosed. A capsule that includes the code support, as well as a system to read and process the code support, are also disclosed. Further disclosed is a method of reading and processing the code support.

18 Claims, 6 Drawing Sheets

(51) Int. Cl.
*A47J 31/44* (2006.01)
*B65D 85/804* (2006.01)
*G06K 19/06* (2006.01)

(52) U.S. Cl.
CPC ... *G06K 7/10613* (2013.01); *G06K 19/06028* (2013.01); *G06K 19/06046* (2013.01); *G06K 19/06075* (2013.01); *G06K 19/06168* (2013.01); *G06K 2019/06253* (2013.01)

(58) Field of Classification Search
CPC .. G06K 19/06168; G06K 7/1421; G06K 7/14; B65D 1/265
USPC .......................................................... 235/437
See application file for complete search history.

(56) References Cited

U.S. PATENT DOCUMENTS

| | | | | |
|---|---|---|---|---|
| 4,250,405 A * | 2/1981 | Ashcroft | ............... | B07C 5/3412 235/456 |
| 4,585,931 A * | 4/1986 | Duncan | ................ | B07C 5/3412 235/462.14 |
| 4,901,073 A * | 2/1990 | Kibrick | ................ | H03M 1/308 341/13 |
| 4,983,815 A * | 1/1991 | Kumasaka | ............... | G11B 7/26 235/376 |
| 5,216,234 A * | 6/1993 | Bell | ........................ | G06K 7/14 194/214 |
| 5,260,556 A * | 11/1993 | Lake | ................. | G06K 19/06037 235/462.03 |
| 5,798,514 A * | 8/1998 | Domanik | ......... | G06K 19/06028 235/462.03 |
| 6,144,742 A * | 11/2000 | Gotoh | ............... | G11B 20/00115 369/53.21 |
| 6,209,435 B1 * | 4/2001 | Miyazaki | ................ | B26D 3/085 83/300 |
| 2002/0014531 A1 * | 2/2002 | Murphy | .................. | G06K 7/14 235/462.03 |
| 2003/0076775 A1 * | 4/2003 | Sato | .................... | G11B 7/00736 369/275.3 |
| 2003/0121979 A1 * | 7/2003 | D'Haens | .......... | G06K 19/06028 235/462.03 |
| 2003/0179688 A1 * | 9/2003 | Blankenbeckler | . | G11B 7/00736 369/275.3 |
| 2006/0083155 A1 * | 4/2006 | Shimizu | ............. | G11B 7/00736 369/275.4 |
| 2006/0239742 A1 * | 10/2006 | Bateman | .................. | B41J 31/16 400/208 |
| 2011/0052761 A1 * | 3/2011 | Yoakim | .................. | A47J 31/22 426/77 |
| 2013/0233914 A1 * | 9/2013 | Lillard, Jr. | ............ | B65D 1/265 235/375 |

OTHER PUBLICATIONS

Written Opinion of the International Searching Authority, dated Oct. 31, 2014, in PCT/EP2014/070724, filed Sep. 29, 2014.

* cited by examiner

SUPPORT AND CAPSULE FOR PREPARING A BEVERAGE BY CENTRIFUGATION, SYSTEM AND METHOD FOR PREPARING A BEVERAGE BY CENTRIFUGATION

CROSS REFERENCE TO RELATED APPLICATIONS/INCORPORATION BY REFERENCE STATEMENT

This application is a US national stage application filed under 35 USC §371 of International Application No. PCT/EP2014/070724, filed Sep. 29, 2014; which claims priority to EP Application No. 13186568.5, filed Sep. 30, 2013, and EP Application No. 14155808.0, filed Feb. 19, 2014. The entire contents of the above-referenced application are hereby expressly incorporated herein by reference.

FIELD OF THE INVENTION

The presently disclosed and/or claimed inventive concept(s) pertains to the field of the beverage preparation, in particular using capsules containing an ingredient for preparing a beverage in a beverage preparation machine. The presently disclosed and/or claimed inventive concept(s) relates in particular to optically readable codes adapted to store information related to a capsule, capsules associated with/or embedding a code support which comprises the code, reading and processing methods and arrangements for reading and using such information for preparing a beverage.

BACKGROUND

For the purpose of the present description, a "beverage" is meant to include any human-consumable liquid substance, such as coffee, tea, hot or cold chocolate, milk, soup, baby food or the like. A "capsule" is meant to include any pre-portioned beverage ingredient or combination of ingredients (hereafter called "ingredient") within an enclosing packaging of any suitable material such as plastic, aluminium, a recyclable and/or bio-degradable material and combinations thereof, including a soft pod or a rigid cartridge containing the ingredient.

Certain beverage preparation machines use capsules containing an ingredient to be extracted or to be dissolved and/or an ingredient that is stored and dosed automatically in the machine or else is added at the time of preparation of the drink. Some beverage machines possess liquid filling means that include a pump for liquid, usually water, which pumps the liquid from a source of water that is cold or indeed heated through heating means, e.g. a thermoblock or the like. Certain beverage preparation machines are arranged to prepare beverages by using a centrifugation extraction process. The principle mainly consists in providing beverage ingredient in a container of the capsule, feeding liquid in the receptacle and rotating the receptacle at elevated speed to ensure interaction of liquid with powder while creating a gradient of pressure of liquid in the receptacle; such pressure increasing gradually from the centre towards the periphery of the receptacle. As liquid traverses the coffee bed, extraction of the coffee compounds takes place and a liquid extract is obtained that flows out at the periphery of the receptacle.

Typically, it is suitable to offer to the user a range of capsules of different types containing different ingredients (e.g., different coffee blends) with specific taste characteristics, to prepare a variety of different beverages (e.g., different coffee types) with a same machine. The characteristics of the beverages can be varied by varying the content of the capsule (e.g., coffee weight, different blends, etc.) and by adjusting key machine parameters such as the supplied liquid volume or temperature, the rotational speed, the pressure pump. Therefore, there is a need for identifying the type of capsule inserted in the beverage machine to enable the adjustment of the brewing parameters to the inserted type. Moreover, it may also be desirable for capsules to embed additional information, for example safety information like use-by date or production data like batch numbers.

WO2010/026053 relates to a controlled beverage production device using centrifugal forces. The capsule may comprise a barcode provided on an outside face of the capsule and which enables a detection of the type of capsule and/or the nature of ingredients provided within the capsule in order to apply a predefined extraction profile for the beverage to be prepared.

It is known from the art, for example in document EP1764015A1, to print locally an identifying barcode on a small area of the circular crown of a coffee wafer for use with a conventional non-centrifugation coffee brewing system. Said systems comprise a barcode reader to read the identifying barcode on the capsule. Barcode readers or barcode scanners are electronic devices comprising a light source, a lens and a light sensor translating optical impulses into electrical ones. They generally comprise a light-emitting/laser diode, or a camera-type sensor. Barcode readers in beverage preparation machine are adapted to read the barcode either by moving the sensing element across the bars (by moving/changing the orientation of the light source beam to scan the entire code), or by taking an image of the whole code at a time with a light-sensitive array/matrix.

Using such kind of code readers is not adapted to be used in the context of a centrifugation extraction based system having a rotating brewing unit. The use of barcode readers having moving parts like a scanning element may raise severe concerns in term terms of reliability since it is likely to be exposed to a harsh environment with cyclical vibrations and hot vapours when placed at the immediate vicinity of the rotating brewing unit. Barcode reader with camera-type sensor should be positioned so as to be able to take an image of the whole barcode. As a consequence, the entire code needs to be directly visible from the reader. The free space available in a rotating brewing unit dedicated to a code reader being quite limited, it is generally not possible to meet this visibility requirement.

Whatever the kind of barcode reader used, the geometrical configuration of the rotating brewing units in centrifugation extraction based systems prevents the barcode reader to read a code spread on a large section of the capsule: as a consequence, the dimensions of the barcode are strictly limited, leading to a very low quantity of coded information for a given level of reliability of the readings, typically around 20 bits only. In addition barcode readers are quite expensive.

Reliably reading code printed on a capsule while said capsule is positioned into a rotating brewing unit implies the reliable recognition of sequences of symbols forming said code, in particular in the harsh environment of the rotating brewing unit. Moreover, the code should also be readable, without knowledge by the code reader of the position and/or orientation in which the capsule has been inserted in the capsule holder. Traditional barcodes and other optical coding elements known in the art for a capsule fail to meet these requirements.

Pending international patent application PCT/EP11/057670 relates to a support adapted to be associated with or be a part of a capsule for the preparation of a beverage. The support comprises a section on which at least one sequence of symbols is represented so as that each symbol is sequentially readable, by a reading arrangement of an external device, while the capsule is driven in rotation about an axis of rotation, each sequence code a set of information related to the capsule. Such presently disclosed and/or claimed inventive concept(s) enables to make a large volume of coded information available, such as about 100 bits of redundant or non-redundant information, without using barcode readers having moving parts like a scanning element which may raise severe concerns in terms of reliability. Another advantage is also to be able to read the code support by rotating the capsule while the capsule is in place, in a ready to brew position in the rotary capsule holder. However, the structure of the sequence code.

However, there is still a need to improve the pattern and/or structure of the code represented on the support to enhance the reliability of the readings, in the particular conditions met in a centrifugal beverage machine using capsules for the preparation of the beverage. It still exists a need to provide a capsule with a code reliably readable by a code reader without knowledge of the position and/or orientation of said code, when the capsule is positioned in the rotating capsule holder of a centrifugation extraction based system.

BRIEF DESCRIPTION OF THE FIGURES

The presently disclosed and/or claimed inventive concept(s) will be better understood with reference to the detailed description and the accompanying drawings, which are given as non-limiting examples of embodiments of the presently disclosed and/or claimed inventive concept(s) in which:

DETAILED DESCRIPTION

One non-limiting object of the presently disclosed and/or claimed inventive concept(s) is to provide means for storing, reading and processing information related to a capsule, more particularly information for identifying said capsule within a production machine and for retrieving or reading information for adjusting working parameters of the machine and/or for controlling parameters for preparing a beverage with said capsule. Another object is to provide a capsule embedding such means.

Another non-limiting object is to control optimal conditions for preparing a beverage.

Another non-limiting object is to provide a solution for reliably reading information related to a capsule with a sensor disposed in the machine. In particular the sensor may be disposed in a processing module/brewing unit of the machine, wherein the available space is limited and wherein the environment may be detrimental to such reading: for example, the environment may comprise ingredient traces, vapours and/or liquids from brewing.

One or more of these non-limiting objects are met by a capsule, a support, a device or a method according to the independent claim(s). The dependent claims further provide solutions to these objects and/or additional benefits.

More particularly, according to a first non-limiting aspect, the presently disclosed and/or claimed inventive concept(s) relates to a code support to be associated with or part of a capsule intended for delivering a beverage in a beverage producing device by centrifugation of the capsule. The support comprises a code formed by at least a first sequence of symbols. Said code is represented on the support so that each symbol is sequentially readable by a reading arrangement of an external reading device while the capsule is driven in rotation about an axis of rotation. The first sequence comprises at least one first data sequence formed by at least two sub-sequences of symbols. Each one of said at least two sub-sequences further comprises at least one error-checking symbol for allowing a validity check of the symbols of said sub-sequence.

By providing sequentially readable symbols while the capsule is driven in rotation, the amount of coded data may be raised and/or the area covered by each symbol may be enlarged, improving the overall reliability of the readings. By "sequentially" it should be understood that one or a limited number of symbols (less than the number of symbols comprised in each sequence) are read at a given time: for instance, each symbol can be read separately. As a consequence, at least one reading of all the symbols included in all the sequences in the support can be performed by the reading arrangement after a 360 degrees rotation of the capsule around its axis of rotation.

The structure of the first sequence allows more reliable reading. More particularly, by splitting the first sequence into sub-sequences, each one provided with an error-checking symbol, it is possible to perform a more reliable a validity check, not only for the first sequence globally, but for each sub-sequences. It allows identifying the specific sections of the code which are not correctly read. For instance, it is also possible, having identified which sub-sequences are not correct, to use only valid sub-sequences, and not reject the entire sequence. Moreover, said structure allows more reliable reading of the code, when repetitions of the same sequence are used.

In particular, the information coded by each sub-sequences may comprise information for recognizing a type associated to the capsule, and/or one or a combination of items of the following list:

information related to parameters for preparing a beverage with the capsule, such as the optimal rotational speeds, temperatures of the water entering the capsule, temperatures of the collector of the beverage outside the capsule, flow rates of the water entering the capsule, sequence of operations during the preparation process, etc.;

information for retrieving locally and/or remotely parameters for preparing a beverage with the capsule, for example an identifier allowing the recognition of a type for the capsule;

information related to the manufacturing of the capsule, such as a production batch identifier, a date of production, a recommended date of consumption, an expiration date, etc.;

information for retrieving locally and/or remotely information related to the manufacturing of the capsule.

The symbols arranged in sequences are used to represent data conveying the set of information related to the capsule. For instance, each sequence may represent an integer number of bits. Each symbol may encode one or several binary bits. The data may also be represented by transitions between symbols. The symbols may be arranged in the sequence using a modulation scheme, for example a line coding like a Manchester coding.

Each symbol may be represented in the section by an entity having a measurable characteristic, readable by the measuring arrangement, the measurable characteristic varying according to the value conveyed by said symbol. Each symbol may be printed and/or embossed. The shape of the symbols may be chosen amongst the following non-exhaustive list: arch-shaped segments, segments which are individually rectilinear but extend along at least a part of the section, dots, polygons, geometric shapes. The symbols may be readable by an optical sensor included in the reading arrangement, the colour and/or the shape of each symbol being chosen according to the value of said symbol. The symbols may be printed by an ink which is not visible by human eyes under natural light e.g., ink visible under UV. The symbols may be printed or embossed by a pattern which possesses surfaces having different reflective and/or absorbing properties to light. The pattern may possess first surfaces having inclined mirroring or absorbing properties to light and second surfaces having flat mirroring or flat reflective properties to light. Other variable physical characteristics may be chosen to distinguish each symbol, for example the colour, the reflectivity, the opacity, the light absorption level, the magnetic field, the induced magnetic field, the resistivity, the capacity, etc.

Each sub-sequence of symbols within the first sequence is used to code distinct information related to the capsule. For example, the first sequence may comprise four sub-sequences of symbols. The first sub-sequence can be used to code information related to a recipe for preparing a beverage with the capsule, and comprises also one error-checking symbol PR used to code a parity bit related to the symbols of the first sub-sequence. The second sub-sequence can be used to code information related to the type of the capsule, and comprises an error-checking symbol PT used to code a parity bit related to the symbols of the second sub-sequence. The third sub-sequence can be used to code information related to a pre-wetting cycle during the preparation process of the capsule, and comprises also an error-checking symbol PP used to code a parity bit related to the symbols of the third sub-sequence. The fourth sub-sequence can be used to code information related to the ingredients stored in the capsule, and comprises also an error-checking symbol PPr used to code a parity bit related to the symbols of the fourth sub-sequence.

The at least one error-checking symbol of each one of said at least two sub-sequences can be used to code at least one parity bit, obtained by performing a checksum of the symbols included in the corresponding sub-sequence. The at least one error-checking symbol may comprise error-detecting or error-correcting information, in particular related to data. Information for detecting errors may comprise repetition codes, parity bits (such as even or odd parity bits or a combination thereof), checksums, cyclic redundancy checks, cryptographic hash function data, etc. Information for correcting errors may comprise error-correcting codes, forward error correction codes, and in particular, convolutional codes or block codes.

In certain non-limiting embodiments, the code support comprises at least a second sequence of symbols, the second sequence comprising at least one second data sequence identical to the first data sequence of the first sequence. More particularly, the code support may further comprise a whole number n of sequences of symbols, each one of n sequence(s) comprising at least one data sequence identical to the first data sequence of the first sequence, the number n being greater than or equal to 3. Hence, error-checking may be performed by comparison of the different sub-sequence of each repeated sequence. For example, sub-sequences of the code affected by errors may be processed accordingly. Hence, it improves the probability of a successful reading of the code, should some parts of the sequence be unreadable. In an embodiment, the whole number n is an odd number. It allows a reading algorithm to determine more easily the correct value for a symbol, by limiting the number of situations where, having read the values of a symbol in all the data sequences, there are as much reading equal to 0 as reading equal to 1 for said symbol.

In an embodiment, each sequence further comprises at least one preamble sequence of symbols, and the first sequence and at least one other sequence have their preamble sequences distinct. The distinct preamble sequences allow determining which symbols belong to which sequence, without any knowledge of the angular configuration of the code support when it is positioned in the beverage machine. Moreover, a more robust detection of said critical information for decoding the code is obtained thanks to the use of distinct preamble sequences. For instance, the first preamble sequence may comprise a first 6-bits long sequence $P_A$='10101010', the second 6-bits long sequence $P_B$='010101'. The first sequence may begin with the first sequence $P_A$, then, a first block D1 comprising a data block F1 having n1 bits and with parity check bits. A second sequence may begin with the second sequence $P_B$, then, a second block D2 comprising a data block F2 having n2 bits and with parity check bits. The position of the first sequence and the second sequence may be then determined by using an algorithm for identifying the pattern $P_A$-X1-$P_B$-X2 where X1 stands for any sequence of n1 bits, X2 stands for any sequence of n2 bits. For example, a Number of Equal Bits (NEB) filter can be used. In an embodiment, each preamble sequence of symbols is formed by a plurality of preamble sub-sequences, said plurality of preamble sub-sequences being distributed according to a pattern among the sequence. The first sequence may begin with the first sequence $P_A$, then, a first block D1 comprising a data block F1 having n1 bits and with parity check bits. A second sequence may begin with the second sequence $P_B$, then, a second block D2 comprising a data block F2 having n2 bits and with parity check bits. The position of the first sequence and the second sequence may be then determined by using an algorithm for identifying the pattern $P_A$-X1-$P_B$-X2 where X1 stands for any sequence of n1 bits, X2 stands for any sequence of n2 bits. For example, a Number of Equal Bits (NEB) filter can be used.

Advantageously, the first preamble sequence of symbols and the second preamble sequence of symbols may be chosen/set to minimize the number of equal bits in series in the code.

In certain non-limiting embodiments, the code comprises at least 100 symbols.

The code may be arranged along at least an eighth of the circumference, and in certain non-limiting embodiments, along the entire circumference of the support.

According to a second non-limiting aspect, the presently disclosed and/or claimed inventive concept(s) relates to a capsule intended for delivering a beverage in a beverage producing device by centrifugation comprising a flange-like rim comprising a code support according to the first aspect.

According to a third non-limiting aspect, the presently disclosed and/or claimed inventive concept(s) relates to a system for preparing a beverage from a capsule according to the second aspect, and further comprising a beverage preparation device having capsule holding means for holding the capsule and rotational drive means for driving the holding means and capsule in rotation about said axis of rotation. The beverage preparation devices further comprises a reading arrangement configured for decoding the code represented on the code support:
  by reading separately each symbol of the code, while driving the rotational drive means so as to the capsule performs at least one complete revolution; and,
  by checking the validity of the read symbols and then determining a value for each sub-sequence of the sequence(s), using the error-checking symbols of each sub-sequence of each sequence.

According to a fourth non-limiting aspect, the presently disclosed and/or claimed inventive concept(s) relates to a method reading a code on a capsule according to the second aspect, in a beverage preparation device comprising capsule holding means for holding the capsule and rotational drive means for driving the holding means and capsule in rotation about said axis of rotation; the beverage preparation devices further comprising a reading arrangement. The method comprises the following step:
  reading separately, with the reading arrangement, each symbol of the code, while driving the rotational drive means so as to the capsule performs at least one complete revolution; and,
  checking the validity of the read symbols and then determining a value for each sub-sequence of the sequence(s), using the error-checking symbols of each sub-sequence of each sequence.

Disclosed herein and according to a fifth non-limiting aspect of the presently disclosed and/or claimed inventive concept(s) is a system to read and process a code of a capsule according to the second aspect. The system comprises a beverage preparation device. The beverage preparation device comprises a capsule holding means for holding the capsule, a rotational drive means for driving the holding means and capsule in rotation about said axis of rotation; and a reading arrangement configured to obtain data by reading the code on the capsule during said rotation. The data comprises symbols read from of a plurality of identical sub-sequences on the capsule. The beverage preparation device further comprises a processing unit to receive said data and configured to process said data to perform a step of validating one or more of the symbols of the read identical sub-sequences, the step comprising checking the validity of the read symbols of the identical sub-sequences to derive a validated symbol.

The step of validating one or more of the symbols may comprise checking the value of a symbol in a first sub-sequence of a first sequence, with the value of the corresponding symbol in first sub-sequence of a one or more further sequences.

The step of validating one or more of the symbols may comprise determining a value of each of the identical sub sequences and comparing it to a value of an error checking symbol of the particular sub-sequence.

The identical sub-sequences in the data may be derived by reading a sub-sequence of the data sequence of the first sequence on the capsule a plurality of times. For example, the code of the capsule comprises a single repetition of the sub-sequence of the first data sequence of the first sequence of symbols, the sub-sequence being read during each rotation of the capsule.

The identical sub-sequences in the data may be derived by reading a sub-sequence of the data sequence of the first sequence on the capsule and by reading and identical sub-sequence of a data sequence of one or more further sequences. For example, the code of the capsule comprises a single repetition of a sub-sequence of the first data sequence of the first sequence of symbols and a single repetition of a sub-sequence of the first data sequence of a second sequence of symbols, wherein for each rotation of the capsule the sub-sequences are read once. In another example there may be n sequences, with each sequence comprising a data sequence having an identical sub-sequence, whereby for each read of the code there are 'n' identical sub-sequences read.

It will be appreciated that although the relevant sub-sequences may be coded with identical corresponding symbols on the capsule, they may be read or identified incorrectly such that there are errors in the data. For example, they may be read incorrectly by the reading arrangement and/or identified incorrectly when locating the preamble in an embodiment wherein the code comprises a preamble. Hence the read identical sub-sequences in the data can be processed according to the fifth aspect to derive from the read identical sub-sequences a single validated sub-sequence that comprises one or more validated symbols.

In certain non-limiting embodiments, it is desirable that each sub-sequence is read a plurality of times, for example, by repetition of the subsequence in the code and/or by multiple reads of the same sub-sequence, which can be achieved my by multiple rotations of the capsule. Accordingly, the capsule is, in certain non-limiting embodiments, rotated more than once during reading of the code. In this way the data set of read identical sub-sequences is greater thereby increasing the chance of obtaining a validated sequence.

The validation steps may be performed for one or more of the sub-sequences in the data set of the sequences. For example, the validation steps are performed on the identical first sub-sequences to validate the first sub-sequences, and the validation steps are performed on the identical second sub-sequences to validate the second sub-sequences.

The step of validating the one or more read symbols may comprise determining if the corresponding symbols in the read identical sub-sequences all have the same value and then deriving a validated symbol based on the same value.

The step of validating the one or more read symbols may comprise determining if the majority of the corresponding symbols in the read identical sub-sequences have a same value and then deriving a validated symbol based on the majority value.

The step of validating the symbols may comprise, for each read identical sub-sequence, calculating a checksum of the data symbols included in the sub-sequence. A value of the checksum may be compared to that of the read error-checking symbol of the sub-sequence. If the value of the checksum is not equivalent to that of the error-checking symbol then the particular sub-sequence may be discarded from the data when determining the validated symbol. The error-checking symbol may code a parity bit, which may be either odd or even.

The step of performing the checksum and comparing it to the error-checking symbol may be performed if the step of determining if corresponding symbols in the read identical sub-sequences all have the same value determines that one or more corresponding symbols (Sn) have a different value.

The validated symbol may be derived only if the majority of the identical sub-sequences comprise a value of the checksum which is equivalent to that of the error-checking symbol.

The validated symbol may be derived if, of the sub-sequences with a value of the checksum which is equivalent to that of the error-checking symbol, the corresponding symbols of the sub-sequences all have the same value. In such an instance a validated symbol may be derived based on the same value.

The validated symbol may be derived if, of the sub-sequences with a value of the checksum which is equivalent to that of the error-checking symbol, the corresponding symbols of the sub-sequences have a majority value. In such an instance a validated symbol may be derived based on the majority value.

For other instances a validated symbol may not be derived.

The system of according to the fifth aspect may further comprise a capsule according to the second aspect.

Disclosed herein and according to a sixth non-limiting aspect of the presently disclosed and/or claimed inventive concept(s) is a method of reading and processing a code of a capsule according to the second aspect by means of a beverage preparation device, the beverage preparation device comprising: capsule holding means for holding the capsule; rotational drive means for driving the holding means and capsule in rotation about said axis of rotation; and a reading arrangement. The method comprises obtaining data by using the reading arrangement (100) to read the code on the capsule during rotation of the capsule, the data comprising symbols (Sn) read from and included in a plurality of identical sub-sequences(SSEQ) on the code of the capsule, processing said data by means of a processing unit, wherein the data is processed to perform a step of validating one or more of the symbols (Sn) of the read identical sub-sequences (SSEQ), the step comprising checking the validity of read symbols (Sn) of the identical sub-sequences (SSEQ) to derive a validated symbol.

The method of the sixth aspect may further comprise one or more of the steps of the fifth non-limiting aspect.

Figure 1:
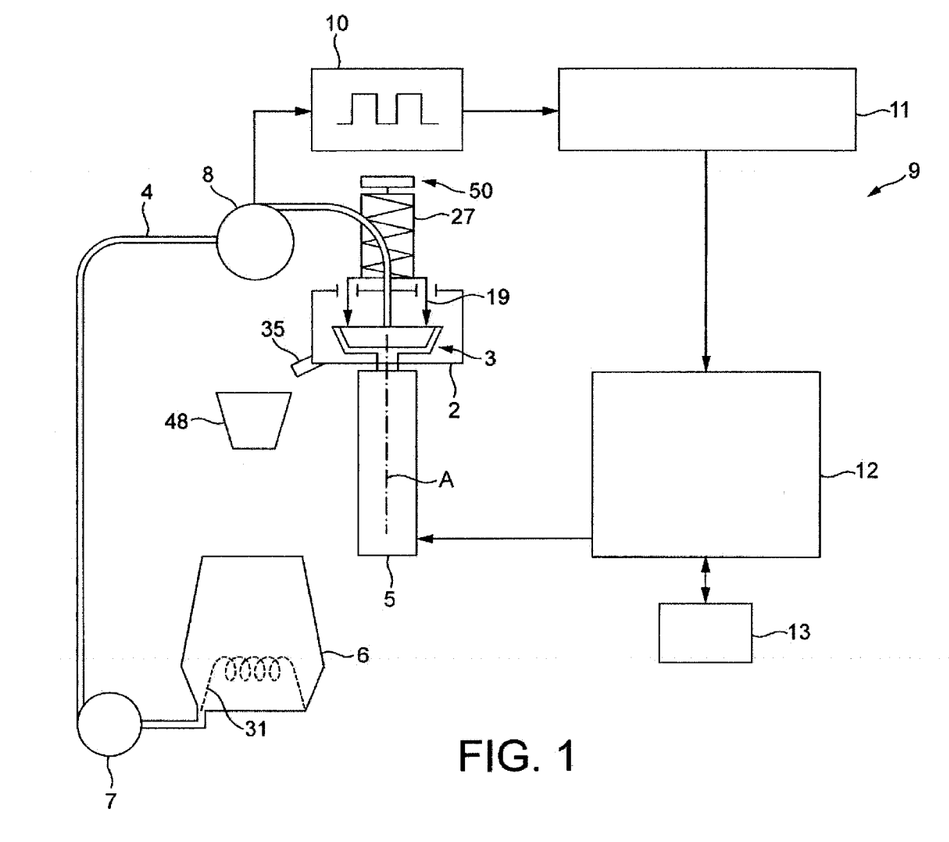
FIG. 1 illustrates the basic principle of the centrifugal extraction.

FIG. 1 illustrates an example of a beverage preparation system 1 in which a capsule according to an aspect of the presently disclosed and/or claimed inventive concept(s) may be used, aspects of the system 1 are described in more detail in WO2010/026053, which is incorporated herein by reference.

The beverage preparation system 1 comprises a centrifugal unit 2 that comprises a centrifugal cell 3 for exerting centrifugal forces on the beverage ingredient and liquid inside the capsule. The cell 3 may comprise a capsule holder for receiving a capsule therein. The centrifugal unit is connected to driving means 5 such as a rotary motor. The centrifugal unit comprises a collecting part and an outlet 35. A receptacle 48 can be disposed below the outlet to collect the extracted beverage. The system further comprises liquid supply means such as a water reservoir 6 and a fluid circuit 4. Heating means 31 may also be provided in the reservoir or along the fluid circuit. The liquid supply means may further comprise a pump 7 connected to the reservoir. A flow restriction means 19 may be provided to create a restriction to the flow of the centrifuged liquid which leaves the capsule. The system may further comprise a flow meter such as a flow-metering turbine 8 for providing a control of the flow rate of water supplied in the cell 3. A counter 11 may be connected to the flow-metering turbine 8 to enable an analysis of generated impulse data 10. The analysed data is may be transferred to a processor unit 12. Accordingly, the exact actual flow rate of the liquid within the fluid circuit 4 can be calculated in real-time. A user interface 13 may be provided to allow the user to input information that is transmitted to the control unit 9. Further characteristics of the system can be found in WO2010/026053.

Figure 3A:
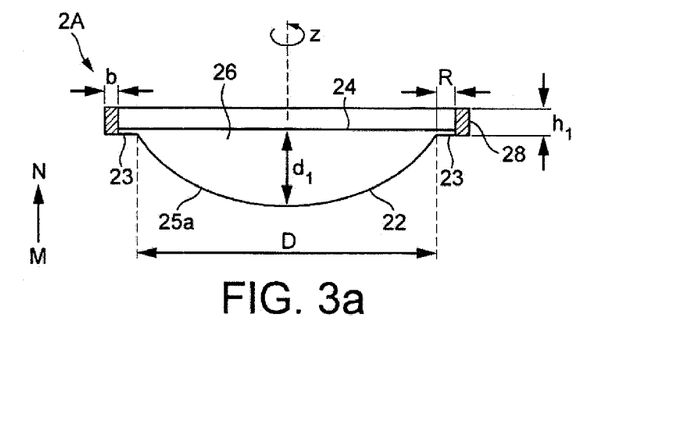
FIGS. 3a, 3b and 3c show an embodiment of a set of capsules according to the presently disclosed and/or claimed inventive concept(s)
Figure 3B:
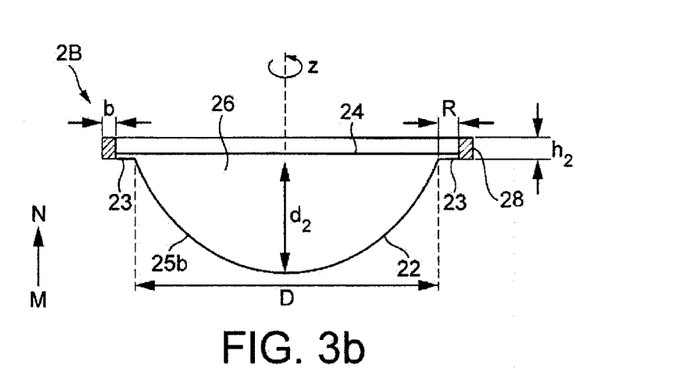
Figure 3C:
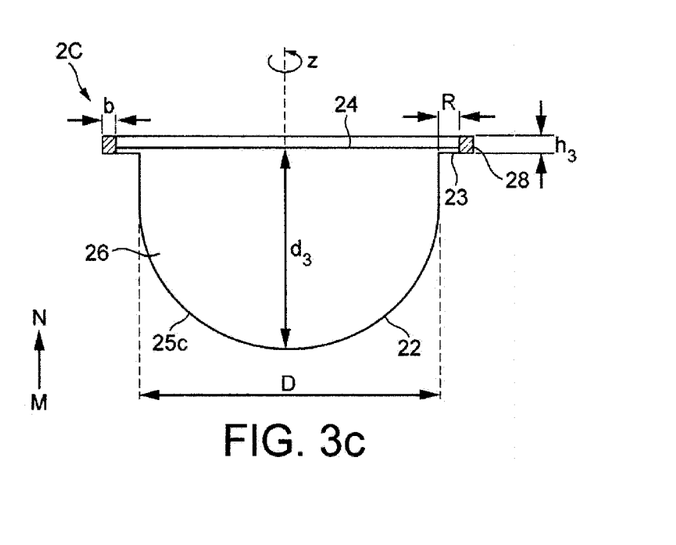

FIGS. 3a, 3b and 3c relate to an embodiment of a set of capsules 2A, 2B, 2C. In certain non-limiting embodiments, the capsules comprise a body 22, a rim 23 and an upper wall member respectively a lid 24. The lid 24 may be a perforable membrane or an aperture wall. Thereby the lid 24 and the body 22 form an enclosure that provides an ingredients compartment 26. As shown in the figures, the lid 24 is, in certain non-limiting embodiments, connected onto an inner annular portion R of the rim 23 that is, in certain non-limiting embodiments, between 1 to 5 mm.

It will be appreciated that the rim may be arranged perpendicular with respect to a rotational axis of the capsule (as shown in the figures) or may be alternatively arranged: for example, it may be inclined or comprise and inclined portion. In certain non-limiting embodiments, the rim 23 of the capsules extends outwardly in a direction essentially perpendicular (as shown) or inclined relative to the axis of rotation Z of the capsule. Thereby, the axis of rotation Z represents the axis of rotation during centrifugation of the capsule in the brewing device, and in particular it coincides with the axis of rotation Z of the capsule holder 32 during centrifugation of the capsule in the brewing device. It should be understood that the shown embodiment is just an exemplary embodiment and that the capsules in particular the capsule body 22 can take various different embodiments.

The body 22 of the respective capsule has a single convex portion 25a, 25b, 25c of variable depth, respectively, d1, d2, d3. Thereby, the portion 25a, 25b, 25c may as well be a truncated or a partially cylindrical portion.

Hence, the capsules 2A, 2B, 2C may comprise different volumes but, in certain non-limiting embodiments, they have an equal insertion diameter D. The capsule of FIG. 3a shows a small volume capsule 2A, whereas the capsules of FIGS. 3b and 3c show a larger volume capsule 2B and 2C respectively. The insertion diameter D is hereby determined at the line of intersection between the lower surface of the rim 23 and the upper portion of the body 22. However, it will be appreciated that the insertion diameter D could be another referencing diameter of the capsule.

In certain non-limiting embodiments, the small volume capsule 2A contains an amount of extraction ingredient, e.g., ground coffee, smaller than the amount for the large volume capsules 2B, 2C. Hence, the small capsule 2A is intended for delivery of a short coffee of between 10 ml and 60 ml with an amount of ground coffee comprised between 4 and 8 grams. The larger capsules 2B is intended for delivery of a medium-size coffee, e.g., between 60 and 120 ml and the largest capsule is intended for delivery of a long-size coffee, e.g., between 120 and 500 ml. Furthermore, the medium-size coffee capsule 2B can contain an amount of ground coffee comprised between 6 and 15 grams and the long-size coffee capsule 2C can contain an amount of ground coffee between 8 and 30 grams.

In addition, the capsules in the set according to the presently disclosed and/or claimed inventive concept(s) may contain different blends of roast and ground coffee or coffees of different origins and/or having different roasting and/or grinding characteristics.

The capsule is designed for rotation about the axis Z. The axis Z crosses perpendicularly the centre of the lid, which in the example is disk-shaped, however it will be appreciated that other shapes are possible, for example, the lid may be concave or convex like the body 22. The axis Z exits at the centre of the bottom of the body. The axis Z will help to define the notion of "circumference" which is a circular path located on the capsule and having the axis Z as a reference axis. The circumference may be defined as being on the lid or on the body part such as on the flange-like rim. The lid may be impervious to liquid before insertion in the device or it may be pervious to liquid by means of small openings or pores provided in the centre and/or periphery of the lid.

Hereafter, the lower surface of the rim 23 refers to the section of the rim 23 that is located outside the enclosure formed by the body and the lid, and is visible when the capsule is oriented on the side where its body is visible.

Further characteristics of the capsules or the set capsules can be found in documents WO 2011/0069830, WO 2010/0066705, or WO2011/0092301, all of which are incorporated herein by reference.

Figure 2A:
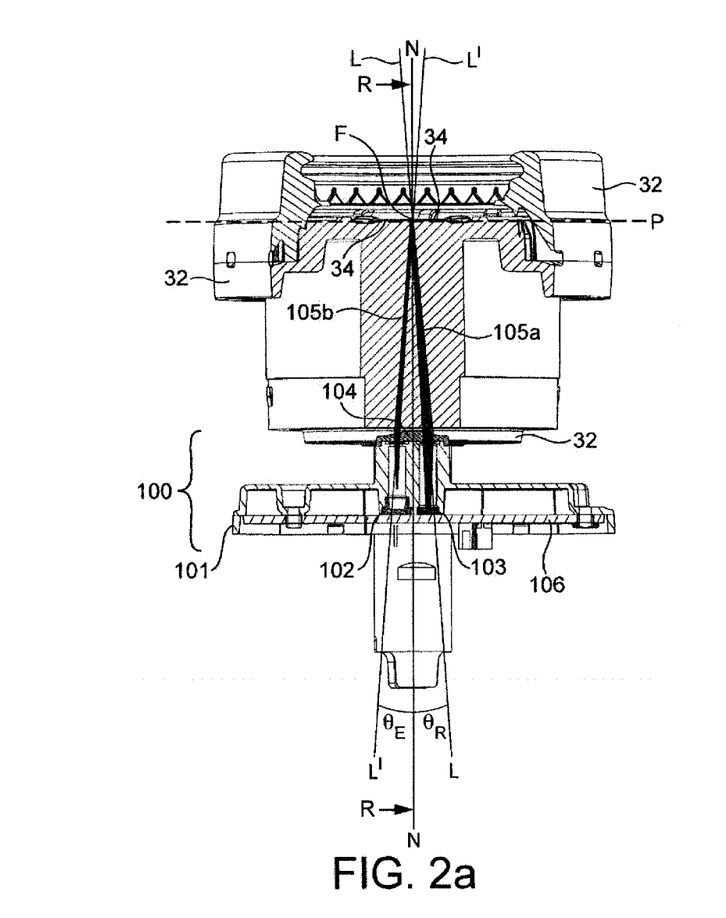
FIGS. 2a and 2b show an embodiment of the centrifugal cell with a capsule holder.
Figure 2B:
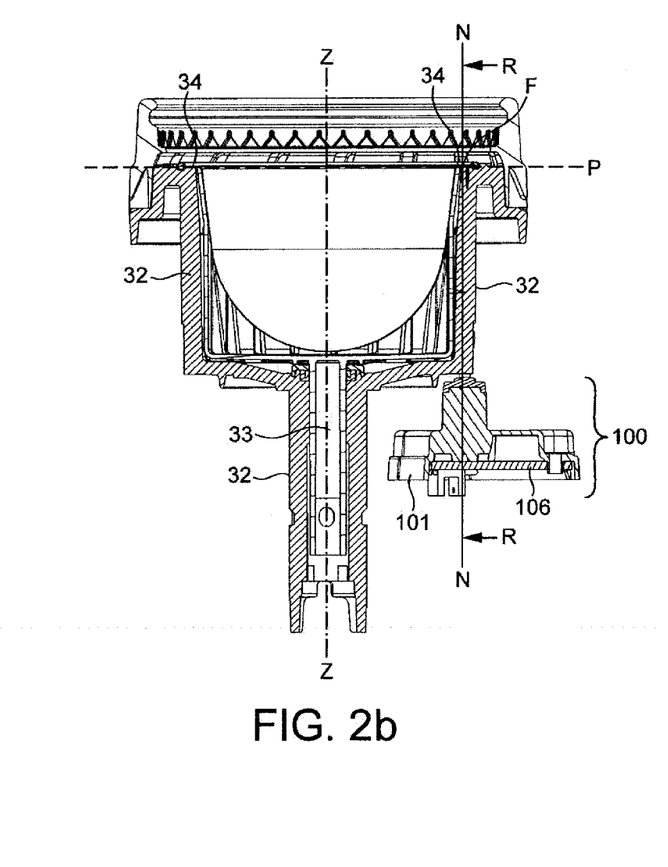

An embodiment of the centrifugal cell 3 with a capsule holder 32 is illustrated by FIGS. 2a and 2b. The capsule holder 32 forms in general a cylindrical or conical wide shaped cavity provided with an upper opening for inserting the capsule and a lower base closing the receptacle. The opening has a diameter slightly larger than the one of the body 22 of the capsule. The outline of the opening fits to the outline of the rim 23 of the capsule. In this way the capsule is configured to be supported by an edge of the opening when the capsule is inserted. As a consequence, the rim 23 of the capsule rests at least partially on a receiving part 34 of the capsule holder 32. The lower base of the cavity is provided with a cylindrical shaft 33 attached perpendicularly to the centre of the external face of the base. The capsule holder 32 rotates around the central axis Z of the shaft 33.

An optical reading arrangement 100 is also shown in FIGS. 2a and 2b. The optical reading arrangement 100 is configured to deliver an output signal comprising information related to a level of reflectivity of a surface of the lower surface of the rim 23 of a capsule supported by the receiving part 34 of the capsule holder 32. The optical reading arrangement is configured to perform optical measurements of the surface of the lower surface of the rim 23 through the capsule holder 32, more particularly through a lateral wall of the cylindrical or conical wide shaped capsule holder 32. Alternatively, the output signal may contain differential information, for instance, differences of reflectivity over time, or contrast information. The output signal may be analogue, for example a voltage signal varying with the information measured over the time. Alternatively, the output signal may be digital, for example, a binary signal comprising numerical data of the information measured over the time.

In the embodiment of FIGS. 2a and 2b, the reading arrangement 100 comprises a light emitter 103 for emitting a source light beam 105a and a light receiver 102 for receiving a reflected light beam 105b.

Typically the light emitter 103 is a light-emitting diode or a laser diode, emitting light in certain non-limiting embodiments with a wavelength within the infrared wavelength range, such as (but not limited to) light with a wavelength of 850 nm. Typically, the light receiver 103 is a photodiode, adapted to convert a received light beam into a current or voltage signal.

The reading arrangement 100 may further comprise or be in communication with a processing unit 106. The processing unit may include a printed circuit board embedding a processor or chip, sensor signal amplifier, signal filters and circuitry for coupling said processing unit 106 to the light emitter 103, the light receiver 102 and to the control unit 9 of the machine. In certain non-limiting embodiments, the processing unit is configured to process the read code to derive a validated code according to the process described in the following.

The light emitter 103, the light receiver 102, and the processing unit 106 are maintained in a fixed position by a support 101, fixed rigidly relatively to the machine frame. The reading arrangement 100 is restrained in a fixed position during an extraction process and is not driven into rotation, contrary to the capsule holder 32.

In particular, the light emitter 103 is disposed such that the source light beam 105a is generally oriented along a line L crossing at a fixed point F a plane P comprising the receiving part 34 of the capsule holder 32, said plane P having a normal line N passing through the point F. The fixed point F determines an absolute position in space where the source light beams 105a is intended to hit a reflective surface: the position of the fixed point F remains unchanged when the capsule holder is rotated. The reading arrangement may comprise focusing means 104, that may in an example comprise: holes; lenses; and/or prisms, configured to make the source light beam 105 converged more efficiently to the fixed point F of the lower surface of the lid of a capsule positioned into the capsule holder 32. In particular, the source light beam 105 may be focused so as to illuminate a disc centred sensibly on the fixed point F and having a diameter d.

The reading arrangement 100 is configured so as the angle $\theta_E$ between the line L and the normal line N is comprised between 2° and 10°, and in particular between 4° and 5° as shown in FIG. 2a. As a consequence, when a reflecting surface is disposed at the point F, the reflected light beam 105b is generally oriented along a line L', crossing the fixed point F, the angle $\theta_R$ between the line L' and the normal line N being comprised between 2° and 10°, and in particular between 4° and 5° as shown in FIG. 2a. The light receiver 102 is disposed on the support 101 so as to gather at least partially the reflected light beam 105b, generally oriented along the line L'. The focusing means 104 may also be arranged to make the reflected light beam 105b concentrating more efficiently to the receiver 102. In the embodiment illustrated in FIG. 2a, 2b, the point F, the line L and the line L' are co-planar. In another embodiment, the point F, the line L and the line L' are not co-planar: for instance, the plane passing through the point F and the line F and the plane passing through the point F and the line L' are positioned at an angle of sensibly 90°, eliminating direct reflection and allowing a more robust reading system with less noise.

The capsule holder 32 is adapted to allow the partial transmission of the source light beam 105a along the line L up to the point F. For instance, the lateral wall forming the cylindrical or conical wide shaped cavity of the capsule holder is configured to be non-opaque to infra-red lights. Said lateral wall can be made of a plastic based material which is translucent to infra-red having entry surfaces allowing infra-red light to enter.

As a consequence, when a capsule is positioned in the capsule holder 32, the light beam 105a hits the bottom part of the rim of said capsule at point F, before forming the reflected light beam 105b. In this embodiment, the reflected light beam 105b passes through the wall of the capsule holder up to the receiver 102.

The section of the lower surface of the rim 23 of a capsule positioned into the capsule holder 32, illuminated at the point F by the source light beam 105, changes over the time, only when the capsule holder 32 is driven into rotation. So, a complete revolution of the capsule holder 32 is required for the source light beam 105 to illuminate the entire annular section of the lower surface of the rim.

The output signal may be computed or generated by measuring over time the intensity of the reflected light beam, and possibly, by comparing its intensity to those of the source light beam. The output signal may be computed or generated by determining the variation over the time of the intensity of the reflected light beam.

It will be appreciated that the reading arrangement and code on the capsule may comprise alternate arrangements. For example, in an embodiment wherein the capsule does not necessarily comprise a rim, the code may be printed on a side of the convex portion of the body with the optical reading arrangement being arranged to perform optical measurements on the side of the capsule.

The capsule according to the presently disclosed and/or claimed inventive concept(s) comprises at least one optically readable code support. The code support can be, in the present example, part of the flange-like rim. Symbols of the code are represented on the optical code support.

The symbols are arranged in at least one sequence, said sequence coding a set of information related to the capsule. Each symbol is used to encode a specific value.

In particular, the set of information of at least one of the sequences may comprise information for recognizing a type associated to the capsule, and/or one or a combination of items of the following list or other relevant information such as operational parameters of the beverage machine.
- information related to parameters for preparing a beverage with the capsule, such as the optimal rotational speed, temperature of the water entering the capsule, temperatures of the collector of the beverage outside the capsule, flow rates of the water entering the capsule, sequence of operations during the preparation process, etc.;
- information for retrieving locally and/or remotely parameters for preparing a beverage with the capsule, for example, an identifier allowing the recognition of a type for the capsule;
- information related to the manufacturing of the capsule, such as a production batch identifier, a date of production, a recommended date of consumption, an expiration date, etc.;
- information for retrieving locally and/or remotely information related to the manufacturing of the capsule.

The above sequence comprises a plurality of sub-sequences, with each sub sequence comprising the information as defined in the above. An example of one suitable sequence SEQ1 is described hereafter in the table 1:

TABLE 1

| SEQ1 | | | | | | | |
|---|---|---|---|---|---|---|---|
| SSEQ1 | | SSEQ2 | | SSEQ3 | | SSEQ4 | |
| Product | | Type | | Priming | | Recipe | |
| S1 . . . S5 | PR | S7 . . . S9 | PT | S11 . . . S14 | PP | S16 . . . S21 | PPr |

In this example the sequence SEQ1 comprises 4 sub-sequences of symbols SSEQ1, SSEQ2, SSEQ3, and SSEQ4. The sub-sequences may comprise various information as exemplified in the following. The first sub-sequence SSEQ1 may be used to code information related to ingredients stored in the capsule, using 5 symbols S1 . . . S5. The first sub-sequence SSEQ1 also comprises an error-checking symbol PR used to code a parity bit related to the 5 symbols S1 . . . S5. The second sub-sequence SSEQ2 may be used to code information related to the type of the capsule, using 3 symbols S7 . . . S9. The second sub-sequence SSEQ2 also comprises an error-checking symbol PT used to code a parity bit related to the 3 symbols S7 . . . S9. The third sub-sequence SSEQ3 may be used to code information related to a pre-wetting cycle during the preparation process of the capsule, using 3 symbols S11 . . . S14. The third sub-sequence SSEQ3 also comprises an error-checking symbol PP used to code a parity bit related to the 3 symbols S11 . . . S14. The fourth sub-sequence SSEQ4 may be used to code information related to the recipe for preparing a beverage with the capsule, using 5 symbols S16 . . . S21. The fourth sub-sequence SSEQ4 comprises also an error-checking symbol PPr used to code a parity bit related to the 5 symbols S16 . . . S21. In this example, each sub-sequence comprises an error checking symbol for identifying reading error of symbols of said sub-sequence. For instance, the error checking symbol can be a parity bit with even parity or odd parity depending of the sub-sequences, obtained by performing the checksum of the symbols included in the corresponding sub-sequences.

The symbols may be distributed on at least ⅛th of the circumference of the annular support, but in particular non-limiting embodiments, around the entire circumference of the annular support. The code may comprise successive arch-shaped segments. The symbols may also comprise successive segments which are individually rectilinear but extend along at least a part of the circumference.

In certain non-limiting embodiments, the sequence is repeated along the circumference in order to ensure a reliable reading. The sequence is repeated at least twice on the circumference. In certain non-limiting embodiments, the sequence is repeated three to six times on the circumference. Repetition of the sequence means that the same sequence is duplicated and the successive sequences are positioned in series along the circumference so that upon a 360-degree rotation of the capsule, the same sequence can be detected or read more than one time.

Figure 4:
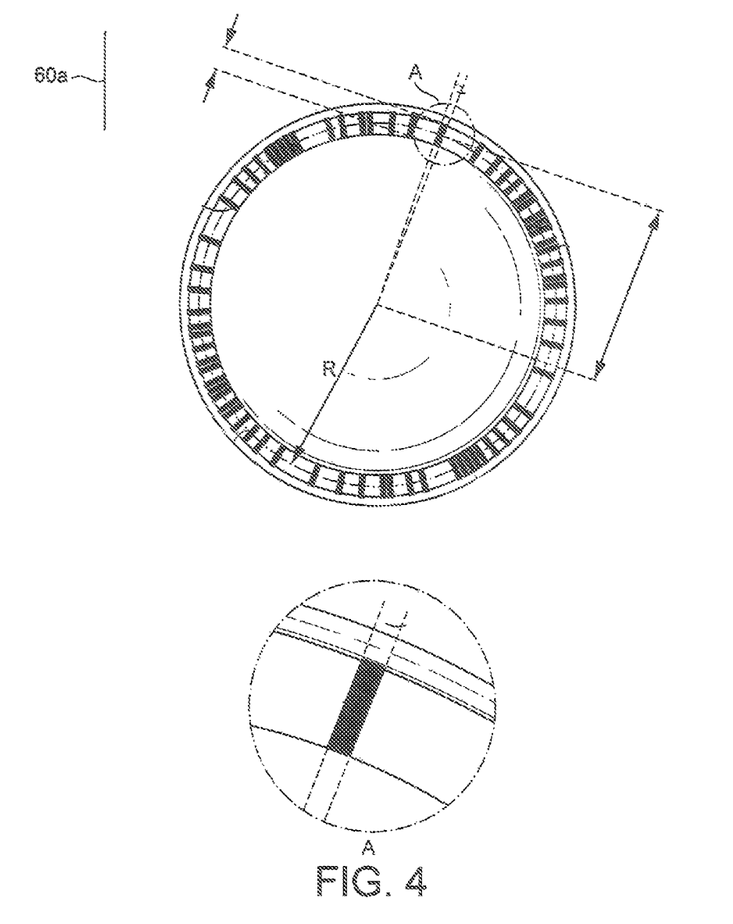
FIG. 4 shows an embodiment of a code support according to the presently disclosed and/or claimed inventive concept(s)

Referring to FIG. 4, an embodiment 60a of a code support is illustrated. The code support 60a occupies a defined width of the rim 23 of the capsule. The rim 23 of the capsule can comprise essentially an inner annular portion forming the support 60a and an outer (non-coded) curled portion. However, it can be that the full width of the rim is occupied by the support 60a, in particular, if the lower surface of the rim can be made substantially flat. This location is particularly advantageous since they offer both a large area for the symbols to be disposed and is less prone to damages caused by the processing module and in particular by the pyramidal plate, and to ingredients projections. As a consequence, the amount of coded information and the reliability of the readings are both improved. In this embodiment, the code support 60a comprises 160 symbols, each symbol coding 1 bit of information. The symbols being contiguous, each symbol has an arc-linear length of 2.25°.

Figure 5:
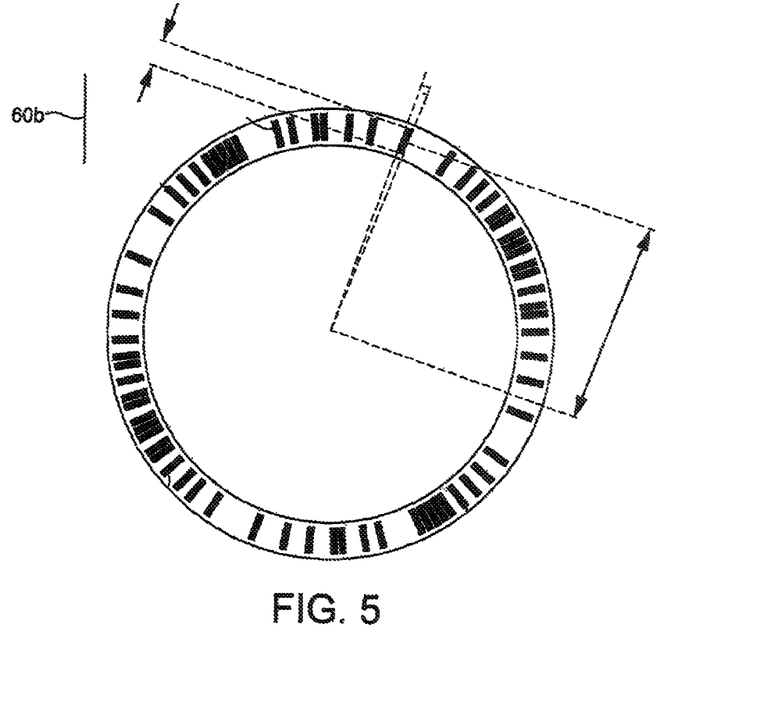
FIG. 5 shows an alternate position of the sequence on the capsule, in particular, when placed on the underside of the rim of the capsule, and the capsule fitted into a capsule holder of the extraction device.
Figure 6:
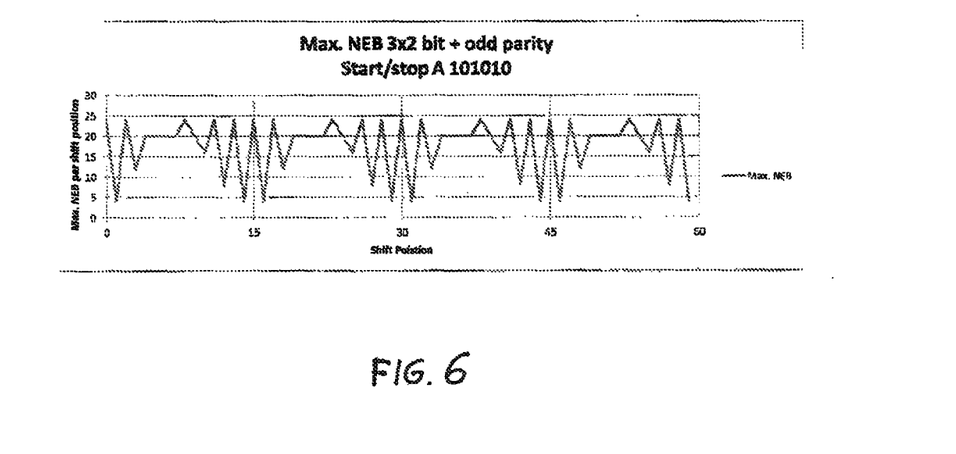
FIG. 6 shows a graphical representation of an example of the results of a NEB filter on a code with a common preamble used by all the sequence of the code.

Referring to FIG. 5, an embodiment 60b of a code support is illustrated in planar view. The code support 60b is adapted to be associated with or be part of a capsule, so as to be driven in rotation when the capsule is rotated around its axis Z by the centrifugal unit 2. The receiving section of the capsule is the lower surface of the rim 23 of the capsule. As shown in FIG. 5, the code support may comprise a ring having a circumferential part on which the at least one sequence of symbols is represented, in this way the user can position it on the circumference of the capsule before introducing it into the brewing unit of the beverage machine. Consequently, a capsule without embedded means for storing information can be modified by mounting such a support so as to add such information. When the support is a separate part, it may be simply added on the capsule without additional fixing means, the user ensuring that the support is correctly positioned when entering the brewing unit, or the form and the dimensions of the support preventing it from moving relatively to the capsule once mounted. The code support 60b may also comprise additional fixing means for rigidly fixing said element to the receiving section of the capsule, such as glue or mechanical means, to help the support remain fixed relative to the capsule once mounted. As also mentioned, the code support 60b may also be a part of the rim itself, for example it is integrated as part of the structure of the capsule.

Each symbol is adapted to be measured by the reading arrangement 100 when the capsule is positioned into the capsule holder and when said symbol is aligned with the source light beam 105a at point F. More particularly, each different symbol presents a level of reflectivity of the source light beam 105a varying with the value of said symbol. Each different symbol has different reflective and/or absorbing properties of the source light beam 105a.

Since the reading arrangement 100 is adapted to measure only the characteristics of the illuminated section of the coding support, the capsule has to be rotated by the driving means until the source light beam has illuminated all the symbols comprised in the code. Typically, the speed for reading the code can be comprised between 0.1 and 4000 rpm. In a particular non-limiting example, it is about 3000 rpm.

In a particular non-limiting example, the code comprises a preamble to enable determination of the location of particular sub-sequences in the read code. Examples of suitable preambles are described in the following, when the preamble comprises sequences which are 6 bits in length.

It will be appreciated however that other suitable preamble sequence lengths may be used, for example, the preamble may be 8, 10 or 12 bits in length. In a particular non-limiting example, the preamble comprises a sequence that is 8 bits in length.

Moreover, the preamble may comprise any suitable number of sequences. For example, there may be four different preamble sequences and in the examples below. Moreover, the same preamble sequence may be repeated within the data set. For example, in the instance of an 8 bit long preamble sequence set there may be four different preamble sequences with one of the preamble sequences repeated to provide a sequence of five preambles.

Alternatively, instead of the preamble, part of the capsule may comprise a marker which, during insertion of the capsule into the receptacle 48, is to be aligned to a corresponding marker of the beverage preparation system 1, wherein the marker is arranged such that the reading arrangement 100 initially reads a particular portion of the code when the capsule is rotated, for example, the particular portion may be the first symbol in the sequence.

Example 1—Code Preamble for Optical Code Support Having Four Sequences, Read in Rotation A suitable preamble P is shown hereafter. The preamble P is spread over the sequences represented on the optical code support. For instance, the preamble P comprises a first 6-bits long sequence $P_A$='101010', a second 6-bits long sequence $P_B$='010101', a third 6-bits long sequence $P_C$='011001', and a fourth third 6-bits long sequence $P_D$'100110'.

A first sequence S1 begins with the first sequence $P_A$, then, a first block D1 comprising three data blocks F11, F12, F13 each with parity check bits. The second sequence S2 begins with the second sequence $P_B$, then, a second block D2 comprising three data blocks F21, F22, F23 each with parity check bits. The third sequence S3 begins with the third sequence $P_C$, then, a third block D3 comprising the three data blocks F11, F12, F13 each with parity check bits. The fourth sequence S4 begins with the fourth sequence $P_D$, then, a fourth block D4 comprising the three data blocks F21, F22, F23 each with parity check bit. Accordingly, the code of the code support represents the following sequence: $P_A$-F11-F12-F13-$P_B$-F21-F22-F23-$P_C$-F11-F12-F13-$P_D$-F21-F22-F23. The first block D1, respectively the second block D2, the third block D3, the fourth D4 comprise a number n1, respectively n2, n3 and n4, of bits.

To read all the symbols of every sequence, in a particular non-limiting embodiment, at least one complete rotation of the optical code support is required. Although it will be appreciated that in an example wherein the code is arranged over a portion of the circumference, for example and eighth of the circumference, then less than a complete revolution is required for complete reading of the sequence.

The position of the first block D1, the second block D2, the third block D3, and the fourth block D4 are determined by looking for the pattern $P_A$-X1-$P_B$-X2-$P_C$-X3-$P_D$-X4 in the sequence of bits read by the optical reader, wherein X1 stands for any sequence of n1 bits, X2 stands for any sequence of n2 bits, X3 stands for any sequence of n3 bits, X4 stands for any sequence of n4 bits. Hence, not only the sequence of bits corresponding to those of the preamble are searched, but the relative positions of $P_A$, $P_B$, $P_C$, $P_D$ are taken into consideration, allowing a more robust and reliable identification of the start of each data blocks.

For example, a Number of Equal Bits (NEB) filter can be applied to the read bits, using the following matching pattern: '101010xxxxxxxxx010101-xxxxxxxxx011001xxxxxxxxx100110xxxxxxxxx', where x corresponds to any bit, and with n1=n2=n3=n4=9 bits.

Figure 7:
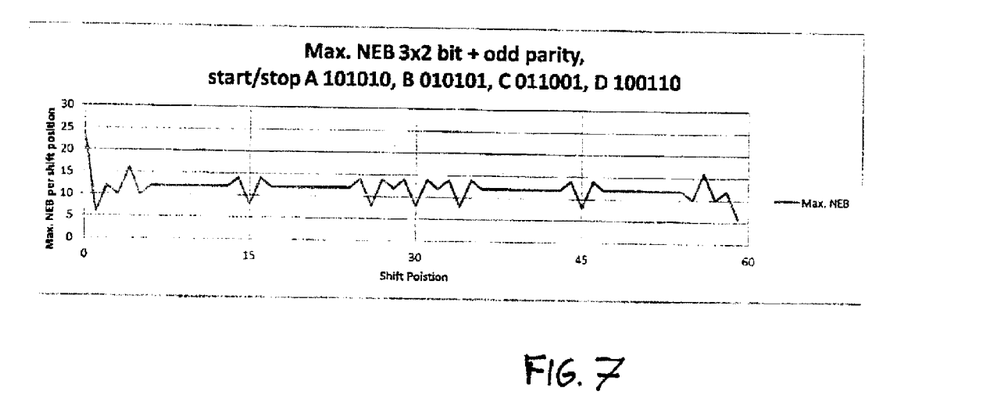
FIG. 7 shows a graphical representation of an example of the results of a NEB filter on a code according to an embodiment of the presently disclosed and/or claimed inventive concept(s)

The filter is applied to read bits, shifting the start position of the rolling filtering window from the first bit read to the last bit read. The position of the filtering window corresponding to the maximum value of the NEB filter is likely to correspond to the start of the first sequence S1. The FIG. 7 shows an example of the results of a NEB filter on such a code structure.

It is also possible to calculate the contrast between the value of the NEB filter for each position of the window relative to the value of the NEB filter at the following position of the window: the position of the window corresponding to the maximum value of the NEB contrast is then likely to correspond to the start of the first sequence S1.

Example 2—Code Preamble for Optical Code Support Having Four Sequences, Read in Rotation A suitable preamble P' is shown hereafter. The preamble P' is spread over the sequences represented on the optical code support. For instance, the preamble P' comprises a first 6-bits long sequence $P_A$='101010', a second 6-bits long sequence $P_B$='010101', a third 6-bits long sequence $P_C$='011001', and a fourth third 6-bits long sequence $P_D$='100110'.

The first sequence $P_A$ comprises three sub-sequences $P_{A1}$='10', $P_{A2}$='10', $P_{A3}$='10'. The second sequence $P_B$ comprises three sub-sequences $P_{B1}$='01', $P_{B2}$='01', $P_{B3}$='01'. The third sequence $P_C$ comprises three sub-sequences $P_{C1}$='01', $P_{C2}$='10', $P_{C3}$='01'. The fourth sequence $P_D$ comprises three sub-sequences $P_{D1}$='10', $P_{D2}$='01', $P_{D3}$='10'.

A first sequence S1 is formed by the sub-sequence $P_{A1}$, then, a data block F1 with a parity check bit, the sub-sequence $P_{A2}$, then, a data block F2 with a parity check bit, the sub-sequence $P_{A3}$, then a data block F3 with a parity check bit. A second sequence S2 is formed by the sub-sequence $P_{B1}$, then, the data block F1 with a parity check bit, the sub-sequence $P_{B2}$, then, the data block F2 with a parity check bit, the sub-sequence $P_{B3}$, then data block F3 with a parity check bit. A third sequence S3 is formed by the sub-sequence $P_{C1}$, then, the data block F1 with a parity check bit, the sub-sequence $P_{C2}$, then, the data block F2 with a parity check bit, the sub-sequence $P_{C3}$, then data block F3 with a parity check bit. A fourth sequence S4 is formed by the sub-sequence $P_{D1}$, then, the data block F1 with a parity check bit, the sub-sequence $P_{D2}$, then, the data block F2 with a parity check bit, the sub-sequence $P_{D3}$, then data block F3 with a parity check bit. Accordingly, the code of the code support represents the following sequence:

$P_{A1}$-F1-$P_{A2}$-F2-$P_{A3}$-F3-$P_{B1}$-F1-$P_{B2}$-F2-$P_{B3}$-F3-$P_{C1}$-F1-$P_{C2}$-F2-$P_{C3}$-F3-$P_{D1}$-F1-$P_{D2}$-F2-$P_{A3}$-F3

The data block F1, respectively the data block F2, the data block F3, the data D4 comprise a number n1, respectively n2, n3 and n4, of bits.

To read all the symbols of every sequence, at least one complete rotation of the optical code support is then needed. Although it will be appreciated that in an example wherein the code is arranged over a portion of the circumference, for example and eighth of the circumference, then less than a complete revolution is required for complete reading of the sequence.

The position of the data block F1, the second block F2, the third block F3 in each sequences S1, S2, S3, S4 are determined by looking for the pattern:

$P_{A1}$-X1-$P_{A2}$-X2-$P_{A3}$-X3-$P_{B1}$-X1-$P_{B2}$-X2-$P_{B3}$-X3-$P_{C1}$-X1-$P_{C2}$-X2-$P_{C2}$-X3-$P_{D1}$-X1-$P_{D2}$-X2-$P_{D3}$-X3 in the sequence of bits read by the optical reader, where X1 stands for any sequence of n1 bits, X2 stands for any sequence of n2 bits, X3 stands for any sequence of n3 bits.

Figure 8:
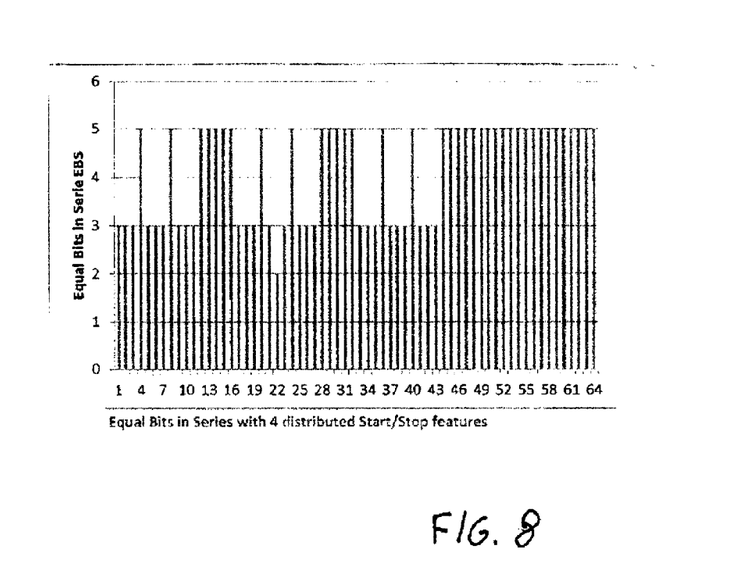
FIG. 8 shows a graphical representation of the number of equal bits in series for a code according to an embodiment of the presently disclosed and/or claimed inventive concept(s).

Hence, not only the sequence of bits corresponding to those of the preamble are searched, but the relative positions of each sub-sequence of $P_A$, $P_B$, $P_C$, $P_D$ are taken into consideration, allowing a more robust and reliable identification of the start of each data blocks. Moreover, by splitting and spreading the preambles into smaller sub-sequences, it is possible to optimize the information coding by minimizing the number of equal bits in series (EBS). FIG. 8 shows the number of equal bits in series for such a code structure.

For example, a Number of Equal Bits (NEB) filter can be applied to the read bits, using the following matching pattern:

'10xxx10xxx10xxx10xxx01xxx-01xxx01xxx01xxx10xxx01xxx10xxx01xxx10xxx', where x corresponds to any bit, and with n1=n2=n3=3 bits.

The filter is applied to read bits, shifting the start position of the rolling filtering window from the first bit read to the last bit read. The position of the filtering window corresponding to the maximum value of the NEB filter is likely to correspond to the start of the first sequence S1.

It is also possible to calculate the contrast between the value of the NEB filter for each position of the window relatively to the value of the NEB filter at the following position of the window: the position of the window corresponding to the maximum value of the NEB contrast is then likely to correspond to the start of the first sequence S1.

Although the above examples show a preamble comprising six bit sequences, it will be appreciated that other word length sequences may be used, for example, the sequence may comprise eight, ten or twelve bit sequences. Moreover, the sequences may comprise a combination of different suitable word lengths.

Example 3—Use of Code Characteristics for Detecting Reading Errors of the Optical Code Support Having Five Repeated Sequences, Read in Rotation In this example the code comprises 5 sequences SEQ1, SEQ2, SEQ3, SEQ4, SEQ5 wherein each sequence has the same structure as shown in the following table 2:

TABLE 2

| SSEQ1 | | SSEQ2 | | SSEQ3 | | SSEQ4 | |
|---|---|---|---|---|---|---|---|
| Product | | Type | | Priming | | Recipe | |
| S1 . . . S5 | PR | S7 . . . S9 | PT | S11 . . . S14 | PP | S16 . . . S21 | PPr |

Each one of 5 sequences SEQ1, SEQ2, SEQ3, SEQ4, SEQ5 comprises 4 sub-sequences of symbols SSEQ1, SSEQ2, SSEQ3, and SSEQ4. Accordingly, for each complete read of the code there are five reads of each sub-sequence. The first sub-sequence SSEQ1 may be used to code information related to a product contained in the capsule, and may comprise 5 symbols S1 . . . S5. The first sub-sequence SSEQ1 comprises also an error-checking symbol PR used to code a parity bit related to the 5 symbols S1 . . . S5. The second sub-sequence SSEQ2 may be used to code information related to the type of the capsule, and may comprise 3 symbols S7 . . . S9. The second sub-sequence SSEQ2 comprises also an error-checking symbol PT used to code a parity bit related to the 3 symbols S7 . . . S9. The third sub-sequence SSEQ3 may be used to code information related to a pre-wetting cycle during the preparation process of the capsule, and may comprise 3 symbols S11 . . . S14. The third sub-sequence SSEQ3 comprises also an error-checking symbol PP used to code a parity bit related to the 3 symbols S11 . . . S14. The fourth sub-sequence SSEQ4 may be used to code the recipe for preparing the product in the capsule, and may comprise 5 symbols S16 . . . S21. The fourth sub-sequence SSEQ4 comprises also an error-checking symbol PPr used to code a parity bit related to the 5 symbols S16 . . . S21.

It will be appreciated that in other examples, there may be one or more sequences SEQ, moreover the one or more sequences may each comprise two or more sub-sequences SSEQ, wherein each sub-sequence SSEQ may comprise a number of symbols S in accordance to the information contained therein, for example, there may be 2-8 symbols, with each sub-sequence comprising an error checking symbol. In certain non-limiting embodiments, the error checking symbol encodes a parity bit, which may be odd or even. In an advantageous example the parity bit is a mixture of odd and even. In this way the variance of the data sequence is maximised such that it is easier to discriminate when processed.

Referring back to the example, for each sub-sequence, the individual bits relating to the symbols Sn may be checked using various processes. An exemplary process is provided in the following for the sub-sequence SSEQ2 only. It will be appreciated that other suitable processes can be performed. Moreover, the process may be performed for the other sub-sequences in the sequences. In the exemplary process this sub-sequence is read five times since there are five sequences (SEQ). More reads may be obtained by increasing the number of rotations of the capsule. Accordingly, in this example the symbols S7 . . . S9 relate to the type of the capsule and the error-checking symbol PT is used to code a parity bit related to the 3 symbols S7 . . . S9 (which are read for each of the five repeated sequences SEQ1, SEQ2, SEQ3, SEQ4, SEQ5). The table 3 illustrates the result of the reading:

TABLE 3

|  | S7 | S8 | S9 | PT |
|---|---|---|---|---|
| SEQ1 | b11 | b12 | b13 | PT1 |
| SEQ2 | b21 | b22 | b23 | PT2 |
| SEQ3 | b31 | b32 | b33 | PT3 |
| SEQ4 | b41 | b42 | b43 | PT4 |
| SEQ5 | b51 | b52 | b53 | PT5 |

Each symbol S7 . . . S9 included in the sub-sequence SSEQ2 may be checked individually using the method described hereafter illustrated for the symbol S7 only.

In a first step, it is determined whether the symbol S7 is identical in each one of the five sequences, i.e. b11=b21=b31=b41=b51. If the first condition is satisfied, then it is considered that the symbols S7 are read correctly and a validated S7 is assigned a value of b11=b21=b31=b41=b51. The table 4 illustrates such a scenario (symbol S7=1). Else a second step may be performed.

TABLE 4

|  | S7 | S8 | S9 | PT | error-checking symbol PT OK? |
|---|---|---|---|---|---|
| SEQ1 | 1 | 0 | 1 | 1 | OK |
| SEQ2 | 1 | 0 | 0 | 1 | NOT OK |
| SEQ3 | 1 | 0 | 1 | 1 | OK |
| SEQ4 | 1 | 0 | 1 | 1 | OK |
| SEQ5 | 1 | 1 | 0 | 1 | OK |

In the second step, if the first condition is not satisfied, then the validity of the error-checking symbol PT may be considered. In this example the error-checking symbol is considered for each one of the five sequences. If there is a majority (i.e. a value above 50%, such as 60% or 70% or 80%) of read symbols S7 associated with a valid error-checking symbol PT, and if all of said read symbols S7 associated with a valid error-checking symbol PT are all identical, then the second condition may be considered satisfied. If the second condition is satisfied then S7 is considered to be read correctly and a validated S7 is assigned a value equal that of the read symbols S7 associated with a valid error-checking symbol PT. The table 5 illustrates such a scenario (symbol S7=1). Else a third step may be performed.

TABLE 5

|  | S7 | S8 | S9 | PT | error-checking symbol PT OK? |
|---|---|---|---|---|---|
| SEQ1 | 1 | 0 | 1 | 1 | OK |
| SEQ2 | 0 | 0 | 1 | 1 | NOT OK |
| SEQ3 | 1 | 0 | 1 | 1 | OK |
| SEQ4 | 1 | 0 | 1 | 1 | OK |
| SEQ5 | 1 | 1 | 1 | 1 | NOT OK |

In the above example the error-checking symbol comprises an odd parity bit, although it will be appreciated that an even parity bit or indeed another type of error checking symbol may be used. For each sub-sequence SSEQ (SSEQ2 in the above example) a checksum of the number of 1s in the read symbols (S7-S9 in the above example) is performed. If the number of 1s is even then since an odd parity bit is used the checksum is assigned a 1, whereas if the number of 1s is odd then the checksum assigned a 0. The checksum is then compared to the read parity bit PT, in a similar fashion the parity bit PT is assigned a 0 or 1 depending on how many 1s there are in the actual sub sequence as opposed to how many that were read. If the value of the checksum and read parity bit PT match then the error checking symbol is considered OK, else the error checking symbol is considered Not OK.

In the third step, if the second condition is not satisfied, then the third condition may be checked. In this example the third step comprises determining whether there is a majority (i.e. a value above 50%, such as 60% or 70% or 80%) of read symbols S7 associated with a valid error-checking symbol PT, and if, amongst the said majority of read symbols S7 associated with a valid error-checking symbol PT, a majority (i.e. a value above 50%, such as 60% or 70% or 80%) have the same value, then the third condition may be considered satisfied. If the third condition is satisfied then it is considered that the symbol S7 has been read correctly and a validated S7 is assigned a value which is equal to the value of the majority of the read symbols having a valid error-checking symbol PT. The table 6 illustrates such a scenario (symbol S7=1). Else a fourth step may be performed.

TABLE 6

|  | S7 | S8 | S9 | PT | error-checking symbol PT OK? |
|---|---|---|---|---|---|
| SEQ1 | 1 | 0 | 1 | 1 | OK |
| SEQ2 | 0 | 0 | 1 | 1 | NOT OK |
| SEQ3 | 0 | 0 | 0 | 1 | OK |
| SEQ4 | 1 | 0 | 1 | 1 | OK |
| SEQ5 | 1 | 0 | 1 | 1 | OK |

In the fourth step, if the third condition is not satisfied, then the symbol S7 may be considered invalid and a validated S7 is not determined. Alternatively put, the fourth step may apply to all conditions other than those that result in a correctly read symbol in the preceding steps. For example, S7 may be determined to be invalid if there is not a majority of read symbols associated with a valid error checking symbol and of this non-majority set there is either a majority or a non-majority of identical symbols.

It will be appreciated that in other examples that the symbols in the read sequence may be checked via other combination of one or more of the above steps. For example, the third step may be omitted.

The invention claimed is:

1. A code support to be associated with or part of a capsule intended for delivering a beverage in a beverage producing device by centrifugation of the capsule, the support comprising:
a code formed by at least a first sequence of symbols, said code being represented on the support so that each symbol is sequentially readable by a reading arrangement of an external reading device while the capsule is driven in rotation about an axis of rotation, the first sequence comprising at least one first data sequence formed by at least two sub-sequences of symbols, each one of said at least two sub-sequences further comprising at least one error-checking symbol for allowing a validity check of the symbols of said sub-sequence;
at least a second sequence of symbols, the second sequence comprising at least one second data sequence identical to the first data sequence of the first sequence; and
wherein each sequence further comprises at least one preamble sequence of symbols, and wherein the first sequence and at least one other sequence have distinct preamble sequences.

2. The code support according to claim 1, wherein each sub-sequence of symbols within the first sequence is used to code distinct information related to the capsule.

3. The code support according to claim 1, wherein the at least one error-checking symbol of each one of said at least two sub-sequences codes at least one parity bit, the parity bit obtained by performing a checksum of the symbols included in the corresponding sub-sequence.

4. The code support according to claim 1, further comprising a whole number n of sequences of symbols, each one of n sequence(s) comprising at least one data sequence identical to the first data sequence of the first sequence, the number n being greater than or equal to 3.

5. The code support according to claim 4, wherein the whole number n is an odd number.

6. The code support according to claim 1, wherein each preamble sequence is formed by a plurality of preamble sub-sequences, said plurality of preamble sub-sequences being distributed over the sequence according to a pattern among the corresponding sequence.

7. The code support according to claim 1, wherein the code comprises at least 100 symbols.

8. The code support according to claim 1, wherein the code is arranged along at least an eighth of a circumference of the capsule.

9. The code support according to claim 1, wherein the code is arranged along an entire circumference of the capsule.

10. A capsule intended for delivering a beverage in a beverage producing device by centrifugation comprising a code support according to claim 1.

11. A system to read and process a code of a capsule according to claim 10, the system comprising a beverage preparation device, the beverage preparation device comprising:
a capsule holder for holding the capsule;
a rotational driver for driving the capsule holder and capsule in rotation about said axis of rotation; and
a reading arrangement configured to obtain data by reading the code on the capsule during said rotation, the data comprising symbols (Sn) read from and included in a plurality of identical sub-sequences (SSEQ) on the code of the capsule,
a processing unit to receive said data and configured to process said data to perform a step of validating one or more of the symbols (Sn) of the read identical sub-sequences (SSEQ), the step comprising checking the validity of corresponding read symbols (Sn) of the identical sub-sequences (SSEQ) to derive a validated symbol.

12. The system according to claim 11, wherein the step of validating the symbols (Sn) comprises determining if the corresponding symbols (Sn) in the read identical sub-sequences all have the same value or if the majority of the corresponding symbols (Sn) in the read identical sub-sequences have the same value and then deriving a validated symbol based on the same value or the majority value.

13. The system according to claim 12, wherein the step of validating the symbols (Sn) comprises, for each read identical sub-sequence, calculating a checksum of the data symbols (Sn) included in the sub-sequence and comparing a value of the checksum to that of the read error-checking symbol of the sub-sequence, wherein if the value of the checksum is not equivalent to that of the error-checking symbol then the particular sub-sequence is discarded from the data when determining the validated symbol.

14. The system according to claim 13, wherein the step of calculating the checksum and comparing it to the error-checking symbol is performed if the step of validating the symbols determines that one or more corresponding symbols (Sn) in the read identical sub-sequences have a different value.

15. The system according to claim 13, wherein a validated symbol is derived only if a majority of the identical sub-sequences comprise a value of the checksum which is equivalent to that of the error-checking symbol.

16. The system according to claim 11, wherein the system further comprises a capsule intended for delivering a beverage in a beverage producing device by centrifugation, wherein the capsule comprises a code support comprising:
a code formed by at least a first sequence of symbols, said code being represented on the support so that each symbol is sequentially readable by a reading arrangement of an external reading device while the capsule is driven in rotation about an axis of rotation, the first sequence comprising at least one first data sequence formed by at least two sub-sequences of symbols, each one of said at least two sub-sequences further comprising at least one error-checking symbol for allowing a validity check of the symbols of said sub-sequence;
at least a second sequence of symbols, the second sequence comprising at least one second data sequence identical to the first data sequence of the first sequence; and
wherein each sequence further comprises at least one preamble sequence of symbols, and wherein the first sequence and at least one other sequence have distinct preamble sequences.

17. A method of reading and processing a code of a capsule according to claim 10 by means of a beverage preparation device, the beverage preparation device comprising: a capsule holder for holding the capsule; a rotational driver for driving the capsule holder and capsule in rotation about said axis of rotation; and a reading arrangement, the method comprising:

obtaining data by using the reading arrangement to read the code on the capsule during rotation of the capsule, the data comprising symbols (Sn) read from and included in a plurality of identical sub-sequences (SSEQ) on the code of the capsule, processing said data by means of a processing unit, wherein the data is processed to perform a step of validating one or more of the symbols (Sn) of the read identical sub-sequences (SSEQ), the step comprising checking the validity of corresponding read symbols (Sn) of the identical sub-sequences (SSEQ) to derive a validated symbol.

18. The method according to claim 17, wherein at least one of:
(a) the step of validating the symbols (Sn) comprises determining if the corresponding symbols (Sn) in the read identical sub-sequences all have the same value or if the majority of the corresponding symbols (Sn) in the read identical sub-sequences have the same value and then deriving a validated symbol based on the same value or the majority value;
(b) the step of validating the symbols (Sn) comprises, for each read identical sub-sequence, calculating a checksum of the data symbols (Sn) included in the sub-sequence and comparing a value of the checksum to that of the read error-checking symbol of the sub-sequence, wherein if the value of the checksum is not equivalent to that of the error-checking symbol then the particular sub-sequence is discarded from the data when determining the validated symbol;
(c) the step of calculating the checksum and comparing it to the error-checking symbol is performed if the step of validating the symbols (Sn) by determining if the corresponding symbols (Sn) in the read identical sub-sequences all have the same value or if the majority of the corresponding symbols (Sn) in the read identical sub-sequences have the same value and then deriving a validated symbol based on the same value or the majority value determines that one or more corresponding symbols (Sn) in the read identical sub-sequences have a different value; and
(d) a validated symbol is derived only if the majority of the identical sub-sequences comprise a value of the checksum which is equivalent to that of the error-checking symbol.

* * * * *